US010174220B2

(12) United States Patent
Sato et al.

(10) Patent No.: US 10,174,220 B2
(45) Date of Patent: Jan. 8, 2019

(54) COATED FILM

(71) Applicant: MITSUBISHI CHEMICAL CORPORATION, Tokyo (JP)

(72) Inventors: Takashi Sato, Maibara (JP); Taishi Kawasaki, Maibara (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 61 days.

(21) Appl. No.: 14/910,094

(22) PCT Filed: Aug. 3, 2015

(86) PCT No.: PCT/JP2015/071943
§ 371 (c)(1),
(2) Date: Feb. 4, 2016

(87) PCT Pub. No.: WO2016/021545
PCT Pub. Date: Feb. 11, 2016

(65) Prior Publication Data
US 2016/0257840 A1 Sep. 8, 2016

(30) Foreign Application Priority Data

Aug. 6, 2014 (JP) .................................. 2014-159954
Oct. 1, 2014 (JP) .................................. 2014-202724

(51) Int. Cl.
*B32B 27/08* (2006.01)
*B32B 27/18* (2006.01)
*B32B 27/20* (2006.01)
*B32B 27/26* (2006.01)
*B32B 27/30* (2006.01)
*B32B 27/36* (2006.01)
*C09D 133/04* (2006.01)
*C09D 133/06* (2006.01)
*C09D 133/08* (2006.01)
*C09D 133/12* (2006.01)
*C09D 133/14* (2006.01)
*C09D 175/04* (2006.01)
*C09D 7/20* (2018.01)
*C09D 7/61* (2018.01)
*C08K 3/013* (2018.01)
(Continued)

(52) U.S. Cl.
CPC ............ *C09D 133/14* (2013.01); *B32B 27/30* (2013.01); *B32B 27/36* (2013.01); *C08G 18/67* (2013.01); *C08G 18/80* (2013.01); *C08J 7/047* (2013.01); *B32B 27/08* (2013.01); *B32B 27/18* (2013.01); *B32B 27/20* (2013.01); *B32B 27/26* (2013.01); *B32B 27/308* (2013.01); *B32B 2250/02* (2013.01); *B32B 2255/10* (2013.01); *B32B 2255/26* (2013.01); *B32B 2333/04* (2013.01); *B32B 2367/00* (2013.01); *C08G 18/672* (2013.01); *C08G 18/673* (2013.01); *C08G 18/8093* (2013.01); *C08J 2367/02* (2013.01); *C08J 2433/00* (2013.01); *C08J 2433/06* (2013.01); *C08J 2433/08* (2013.01); *C08J 2433/10* (2013.01); *C08J 2433/14* (2013.01); *C08K 3/013* (2018.01); *C08K 3/36* (2013.01); *C08K 5/0025* (2013.01); *C08K 5/16* (2013.01); *C08K 5/29* (2013.01); *C08K 9/04* (2013.01); *C08L 33/04* (2013.01); *C08L 33/06* (2013.01); *C08L 33/08* (2013.01); *C08L 33/12* (2013.01); *C08L 33/14* (2013.01); *C08L 75/04* (2013.01); *C09D 7/20* (2018.01); *C09D 7/61* (2018.01); *C09D 133/04* (2013.01); *C09D 133/06* (2013.01); *C09D 133/08* (2013.01); *C09D 133/12* (2013.01); *C09D 175/04* (2013.01); *Y10T 428/2991* (2015.01); *Y10T 428/2993* (2015.01); *Y10T 428/2995* (2015.01); *Y10T 428/31786* (2015.04); *Y10T 428/31797* (2015.04)

(58) Field of Classification Search
None
See application file for complete search history.

(56) References Cited

U.S. PATENT DOCUMENTS

| 4,961,960 | A | * | 10/1990 | Iimure | .................. | C08F 290/06 427/385.5 |
| 5,800,861 | A | * | 9/1998 | Chiang | .................... | C09D 5/32 252/587 |
| 6,022,919 | A | * | 2/2000 | Komoto | ............. | C08G 18/6254 523/200 |
| 6,703,138 | B1 | * | 3/2004 | Taki | ........................ | B32B 27/36 264/288.4 |

(Continued)

FOREIGN PATENT DOCUMENTS

| EP | 2 261 289 | | 12/2010 |
| JP | 02-129235 | A * | 5/1990 |

(Continued)

OTHER PUBLICATIONS

International Search Report issued in App. No. PCT/JP2015/071943 dated Oct. 13, 2015.
International Preliminary Report on Patentability issued in PCT/JP2015/071943 dated Oct. 13, 2015.
Extended European Search Resort issued in App. No. 15823486.4 dated Mar. 30, 2017.

*Primary Examiner* — Vivian Chen
(74) *Attorney, Agent, or Firm* — Nixon & Vanderhye P.C.

(57) ABSTRACT

According to the present invention, there is provide a coated film that is excellent in surface hardness and abrasion resistance and has good adhesion between a polyester film and a hard coat layer. The present invention relates to a coated film comprising a polyester film and a coating layer formed on at least one surface of the polyester film, the coating layer being prepared from a coating solution comprising a (meth)acrylate compound, a reactive silica comprising a (meth)acryloyl group, and an isocyanate-based compound.

6 Claims, No Drawings

(51) Int. Cl.
*C08K 3/36* (2006.01)
*C08K 5/00* (2006.01)
*C08K 5/16* (2006.01)
*C08K 5/29* (2006.01)
*C08K 9/04* (2006.01)
*C08L 33/04* (2006.01)
*C08L 33/06* (2006.01)
*C08L 33/08* (2006.01)
*C08L 33/12* (2006.01)
*C08L 33/14* (2006.01)
*C08L 75/04* (2006.01)
*C08G 18/67* (2006.01)
*C08G 18/80* (2006.01)
*C08J 7/04* (2006.01)

(56) References Cited

U.S. PATENT DOCUMENTS

| | | | |
|---|---|---|---|
| 6,750,270 B1 * | 6/2004 | Klostermann | C09D 7/68 523/200 |
| 7,141,298 B2 | 11/2006 | Shoshi et al. | |
| 2001/0027231 A1 * | 10/2001 | Sugamoto | C08F 283/002 524/493 |
| 2003/0173545 A1 * | 9/2003 | Hino | B29D 11/00865 252/500 |
| 2006/0019114 A1 * | 1/2006 | Thies | C03C 17/007 428/522 |
| 2007/0009750 A1 * | 1/2007 | Ito | B65D 65/02 428/458 |
| 2007/0048519 A1 * | 3/2007 | Anderson | B32B 17/10 428/323 |
| 2007/0112161 A1 * | 5/2007 | Roesler | C08G 18/289 528/25 |
| 2007/0112163 A1 * | 5/2007 | Kinney | C08G 18/2885 528/44 |
| 2007/0112164 A1 * | 5/2007 | Roesler | C08G 18/289 528/44 |
| 2008/0102262 A1 * | 5/2008 | Esaki | B32B 27/36 428/220 |
| 2011/0014477 A1 * | 1/2011 | Kawai | C08G 18/673 428/412 |
| 2011/0077334 A1 * | 3/2011 | Oi | C08F 220/36 524/264 |
| 2013/0065982 A1 * | 3/2013 | Mitsuoka | C08F 2/50 522/90 |
| 2013/0164541 A1 | 6/2013 | Suwa et al. | |
| 2013/0237629 A1 * | 9/2013 | Doi | C08F 290/12 522/77 |
| 2014/0011036 A1 * | 1/2014 | Kato | G02B 1/10 428/423.7 |

FOREIGN PATENT DOCUMENTS

| | | | |
|---|---|---|---|
| JP | 10-166531 | | 6/1998 |
| JP | 11-34243 | | 2/1999 |
| JP | 11-034243 A | * | 2/1999 |
| JP | 2006-205545 | | 8/2006 |
| JP | 2006-205545 A | * | 8/2006 |
| JP | 2013-35275 | | 2/2013 |
| JP | 2013-035275 A | * | 2/2013 |
| JP | 2013-053305 A | * | 3/2013 |
| JP | 2013-064093 A | * | 4/2013 |
| JP | 2013-141771 | | 7/2013 |
| JP | 2013-141771 A | * | 7/2013 |
| JP | 2013-537857 | | 10/2013 |
| JP | 2014-133401 | | 7/2014 |
| WO | WO 2012/114888 A | * | 8/2012 |
| WO | WO 2013-153936 A | * | 10/2013 |

* cited by examiner

COATED FILM

This application is the U.S. national phase of International Application No. PCT/JP2015/071943 filed 3 Aug. 2015 which designated the U.S. and claims priority to JP Patent Application No. 2014-159954 filed 6 Aug. 2014 and JP Patent Application No. 2014-202724 filed 1 Oct. 2014, the entire contents of each of which are hereby incorporated by reference.

TECHNICAL FIELD

The present invention relates to a coated film, and more particularly, to a coated film that is suitably used as a base material for an ITO film of touch panels, and has good surface hardness, good abrasion resistance and good adhesion between a coating layer and a polyester film.

BACKGROUND ART

Polyester films have been extensively used as a base material for a film in various application fields such as building materials, optical materials, wrapping materials, etc., because they are excellent in mechanical properties, dimensional stability, heat resistance, transparency, electrical isolation properties, chemical resistance, etc.

However, the polyester films have a low surface hardness and a low abrasion resistance. Therefore, there tends to arise such a problem that the polyester films suffer from flaws during various processing steps or during use thereof.

For the above reason, in order to enhance the surface hardness and the abrasion resistance of the polyester film, it is known that a hard coat layer is formed on a surface of the polyester film (Patent Literature 1). However, the hard coat layer generally has low adhesion properties to the polyester film, and therefore tends to be peeled off from the polyester film during various steps or during use thereof.

In order to solve the above problems and enhance the adhesion properties to the polyester film, there is known a method in which an easy-adhesion layer using a binder such as acrylic resins, urethane resins, polyester resins, etc., is formed on a surface of the polyester film (Patent Literature 2), and a method in which the polyester film is subjected to surface activation treatment such as corona treatment. In addition, it is also known that polyfunctional acrylates and melamine compounds are used in the hard coat layer to thereby enhance the adhesion properties to the polyester film without conducting the above-described treatment (Patent Literature 3). In this method, it is possible to use an in-line coating method in which formation of the polyester film and formation of the coating layer on the polyester film are simultaneously conducted. This method, therefore, is more excellent in production cost than the above-described methods of enhancing the adhesion properties. However, in the above-described methods, the coating layer tends to hardly exhibit satisfactory adhesion properties to the polyester film.

CITATION LIST

Patent Literature

Patent Literature 1: Japanese Patent Application Laid-Open (KOKAI) No. 11-34243
Patent Literature 2: Japanese Patent Application Laid-Open (KOKAI) No. 10-166531
Patent Literature 3: Japanese Patent Application Laid-Open (KOKAI) No. 2006-205545

SUMMARY OF INVENTION

Technical Problem

The present invention has been accomplished in view of the above conventional problems. An object of the present invention is to provide a coated film that is excellent in surface hardness and abrasion resistance and has good adhesion between a polyester film and a hard coat layer.

Solution To Problem

As a result of the present inventors' earnest study in view of the above problems, it has been found that these problems can be solved by a coated film having a specific structure. The present invention has been attained on the basis of this finding.

That is, in an aspect of the present invention, there is provided a coated film comprising:
a polyester film, and
a coating layer which is formed on at least one surface of the polyester film and prepared from a coating solution comprising:
a (meth)acrylate compound,
a reactive silica comprising a (meth)acryloyl group, and
an isocyanate-based compound.

Advantageous Effects of Invention

In accordance with the present invention, it is possible to provide a coated film having a high surface hardness and good adhesion properties to a polyester film. Therefore, the present invention has a high utility value from industrial viewpoints.

DESCRIPTION OF EMBODIMENTS

The polyester film constituting the polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited thereto.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

The polymerization catalyst for production of the polyester is not particularly limited, and any suitable compounds conventionally known as the polymerization catalyst may be used therefor. Examples of the polymerization catalyst include a titanium compound, a germanium compound, an antimony compound, a manganese compound, an aluminum compound, a magnesium compound and a calcium compound. Of these compounds, the titanium compound or the germanium compound is preferably used because they exhibit a high catalytic activity, and are capable of conducting the polymerization even when used in a small amount, and enhancing a brightness of the obtained film owing to a less amount of the metal remaining in the film. Further, the use of the titanium compound is more preferably used because the germanium compound is expensive.

In the case where the polyester is produced using the titanium compound as the polymerization catalyst, the content of the titanium element in the polyester is preferably in the range of not more than 50 ppm, more preferably 1 to 20 ppm, and even more preferably 2 to 10 ppm. When the content of the titanium element in the polyester is excessively large, the polyester tends to suffer from accelerated deterioration in the melt-extrusion step of the polyester, so that the resulting film tends to have a strongly yellowish color. On the other hand, when the content of the titanium element in the polyester is excessively small, the polymerization efficiency for production of the polyester tends to be deteriorated, so that the product cost tends to be increased, and the resulting film tends to fail to exhibit a sufficient strength. In addition, when the polyester is produced using the titanium compound as the polymerization catalyst, for the purpose of suppressing deterioration of the polyester, a phosphorus compound is preferably used to reduce activity of the titanium compound. As the phosphorus compound, orthophosphoric acid is preferably used in view of productivity and thermal stability of the polyester. The content of the phosphorus element in the polyester is preferably in the range of 1 to 300 ppm, more preferably 3 to 200 ppm, and even more preferably 5 to 100 ppm based on the amount of the polyester melt-extruded. When the content of the phosphorus element in the polyester is excessively large, there tend to occur problems such as gelation and inclusion of foreign matters. On the other hand, when the content of the phosphorus element in the polyester is excessively small, it is not possible to reduce activity of the titanium compound to a sufficient extent, so that the resulting film tends to exhibit a yellowish color.

The polyester film used in the present invention may also comprise an ultraviolet absorber in order to improve a weather resistance of the film and prevent deterioration in liquid crystals, etc. The ultraviolet absorber is not particularly limited as long as it is a compound having a capability of absorbing an ultraviolet ray and can withstand heat Applied during a process for producing the polyester film.

As the ultraviolet absorber, there are generally known an organic ultraviolet absorber and an inorganic ultraviolet absorber. In view of a good transparency, among these ultraviolet absorbers, the organic ultraviolet absorber is preferred. Examples of the organic ultraviolet absorber are not particularly limited, and include cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are preferred in view of a good durability. These ultraviolet absorbers may be used in combination of any two or more thereof.

For the purpose of imparting easy-slipping properties to the film and preventing occurrence of flaws in the film during the respective steps, particles may also be compounded in the polyester film. The kinds of particles to be compounded in the polyester film are not particularly limited as long as the particles are capable of imparting good easy-slipping properties to the film. Specific examples of the particles include inorganic particles of silica, calcium carbonate, magnesium carbonate, barium carbonate, calcium sulfate, calcium phosphate, magnesium phosphate, kaolin, aluminum oxide, titanium oxide, etc., and organic particles of acrylic resins, styrene resins, urea resins, phenol resins, epoxy resins, benzoguanamine resins, etc. Further, there may also be used deposited particles obtained by precipitating and finely dispersing a part of metal compounds such as a catalyst during the process for production of the polyester.

The shape of the particles used above is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

In addition, the average particle diameter of the particles used above is preferably not more than 5 µm, and more preferably in the range of 0.01 to 3 µm. When the average particle diameter of the particles is in the above-specified range, the resulting film having a good transparency and good easy-slipping properties can be obtained.

The content of the particles in the polyester film is preferably not more than 5% by weight, more preferably 0.0003 to 3% by weight based on the weight of the polyester film comprising the particles. When the polyester film comprises no particles or a less amount of the particles, although the resulting film has a high transparency and therefore a good film is provided, the film tends to be insufficient in easy-slip properties. As a result, it might be necessary to take another measure such as the measure of incorporating the particles into a coating layer of the film to enhance easy-slip properties of the film. Further, when the content of the particles added to the polyester film is more than 5% by weight, the resulting film tends to be insufficient in transparency.

The method of adding the particles to the polyester film is not particularly limited, and any conventionally known methods can be suitably used therefor. For example, the particles may be added at any optional stages in the process for production of the polyester constituting the respective layers. The particles are preferably added to the polyester after completion of the esterification reaction or transesterification reaction.

Meanwhile, the polyester film used in the present invention may also comprise, in addition to the above-described particles or ultraviolet absorber, known additives such as an antioxidant, an antistatic agent, a thermal stabilizer, a lubricant, a dye, a pigment, etc., if required.

The thickness of the polyester film used in the present invention is not particularly limited as long as it lies within any suitable range capable of forming a film shape, and is preferably in the range of 10 to 350 µm and more preferably 15 to 300 µm.

Next, an example of the process of producing the polyester film used in the present invention is specifically explained, although not particularly limited thereto. That is, in the production process, there is preferably used such a method in which pellets obtained by drying the above-described raw polyester material are extruded from a die using a single-screw extruder in the form of a molten sheet, and the molten sheet is then cooled and solidified on a chilled roll to obtain an undrawn sheet. In this case, in order to enhance a flatness of the obtained sheet, it is preferred to enhance adhesion between the sheet and the rotary chilled drum. For this purpose, an electrostatic pinning method or a liquid coating adhesion method is preferably used. Next, the thus obtained undrawn sheet is biaxially drawn. In such a case, the undrawn sheet is first drawn in one direction thereof using a roll-type or tenter-type drawing machine. The drawing temperature is usually 70 to 120° C. and preferably 80 to 110° C., and the draw ratio is usually 2.5 to 7 times and preferably 3.0 to 6 times. Next, the thus drawn film is further drawn in the direction perpendicular to the drawing direction of the first stage. In this case, the drawing temperature is usually 70 to 170° C., and the draw ratio is usually 3.0 to 7 times and preferably 3.5 to 6 times. Successively, the resulting biaxially drawn sheet is heat-set at a temperature of 180 to 270° C. under a tension or under relaxation within 30% to obtain a biaxially oriented film. Upon the above drawing steps, there may also be used the method in which the drawing in each direction is carried out in two or more stages. In such a case, the multi-stage drawing is preferably performed such that the thaw ratio in each of the two directions finally falls within the above-specified range.

Also, there may also be used a simultaneous biaxial drawing method. The simultaneous biaxial drawing method is such a method in which the above undrawn sheet is drawn and oriented in both of the machine and width directions at the same time while maintaining the sheet in a suitable temperature-controlled condition at a temperature of usually 70 to 120° C. and preferably 80 to 110° C. The draw ratio used in the simultaneous biaxial drawing method is 4 to 50 times, preferably 7 to 35 times and more preferably 10 to 25 times in terms of an area ratio of the film. Successively, the obtained biaxially drawn sheet is heat-treated at a temperature of 170 to 250° C. under a tension or relaxation within 30% to obtain a drawn oriented film. As the apparatus used in the above simultaneous biaxial drawing method, there may be employed those drawing apparatuses of any conventionally known type such as a screw type drawing apparatus, a pantograph type drawing apparatus and a linear drive type drawing apparatus.

Next, the method of forming the coating layer constituting the coated film according to the present invention is explained. The coating layer may be formed by either an in-line coating method in which the surface of the polyester film is subjected to coating treatment during the forming step of the polyester film, or an off-line coating method in which the polyester film produced is once transferred to an outside of the film production system and subjected to coating treatment. For the following reason, the polyester film is more preferably produced by the in-line coating method.

The in-line coating method is a method in which the coating step is carried out during the process for production of the polyester film, more specifically, such a method in which the coating step is carried out in an optional stage from melt-extrusion of the polyester up to taking-up of the film through the drawing and heat-setting steps. In general, any of the undrawn sheet obtained by melting and rapidly cooling the polyester, the monoaxially drawn film obtained by drawing the undrawn sheet, the biaxially oriented film before the heat-setting, or the film after the heat-setting but before the taking-up may be subjected to the coating step. For example, when the film is produced by a sequential biaxial drawing method, the method in which the monoaxially drawn film obtained by drawing the undrawn sheet in a longitudinal direction (length direction) thereof is subjected to the coating step, and then the resulting coated monoaxially drawn film is further drawn in a lateral direction thereof is more excellent, though not particularly limited thereto. The above method has merits in view of production costs because formation of the film and formation of the coating layer can be performed at the same time. In addition, since the coating layer is formed on the film before drawing, the coating layer and the base material film can be drawn at the same time, so that adhesion between the base material film and the coating layer can be strengthened. Further, upon the biaxial drawing of the polyester film, the film is drawn in a lateral direction thereof while grasping end portions of the film with clips, etc., and therefore constrained in both the longitudinal and lateral directions thereof. This allows the polyester film to be exposed to high temperature while keeping a flatness thereof without formation of wrinkles, etc., when subjected to heat-setting. Therefore, the temperature used in the heat treatment to be conducted after the coating can be increased up to a high temperature which has not been reached in the other conventional methods, so that the film-forming properties, the surface hardness and the abrasion resistance of the coating layer can be enhanced, and the adhesion between the coating layer and the base material film can be further strengthened.

In the present invention, it is essentially required that a polyester film is provided on at least one surface thereof with a coating layer prepared from a coating solution comprising a (meth)acrylate compound, a reactive silica comprising a (meth)acryloyl group, and an isocyanate-based compound. The coating layer of the preferred embodiment of the present invention further comprises an acrylic resin.

The above (meth)acrylate compound is not particularly limited, and any (meth)acrylate compounds conventionally known may be used. Examples of the (meth)acrylate compounds include monofunctional (meth)acrylates, bifunctional (meth)acrylates, and tri- or higher-functional polyfunctional (meth)acrylates. Among these (meth)acrylates, for the purpose of attaining a high hardness, preferred are the tri- or higher-functional polyfunctional (meth)acrylates.

The monofunctional (meth)acrylates are not particularly limited. Examples of the monofunctional (meth)acrylates include alkyl (meth)acrylates such as methyl (meth)acrylate, n-butyl (meth)acrylate, 2-ethylhexyl (meth)acrylate, lauryl (meth)acrylate, stearyl (meth)acrylate, cyclohexyl (meth)acrylate and isobornyl (meth)acrylate; hydroxyalkyl (meth)acrylates such as hydroxyethyl (meth)acrylate, hydroxypropyl (meth)acrylate and hydroxybutyl (meth)acrylate; alkoxyalkyl (meth)acrylates such as methoxyethyl (meth)acrylate, ethoxyethyl (meth)acrylate, methoxypropyl (meth)acrylate and ethoxypropyl (meth)acrylate; aromatic (meth)acrylates such as benzyl (meth)acrylate and phenoxyethyl (meth)acrylate; amino group-containing (meth)acrylates such as diaminoethyl (meth)acrylate and diethylaminoethyl (meth)acrylate; ethyleneoxide-modified (meth)acrylates ouch as methoxyethylene glycol (meth)acrylate, phenoxypolyethylene glycol (meth)acrylate and phenyl phenol ethyleneoxide-modified (meth)acrylate; and glycidyl (meth)acrylate, tetrahydrofurfuryl (meth)acrylate and (meth)acrylic acid.

The bifunctional (meth)acrylates are not particularly limited. Examples of the bifunctional (meth)acrylates include alkanediol di(meth)acrylates such as 1,4-butanediol di(meth)acrylate, neopentyl glycol di(meth)acrylate, 1,6-hexanediol di(meth)acrylate, 1,9-nonanediol di(meth)acrylate and tricyclodecanedimethanol di(meth)acrylate; bisphenol-modified di(meth)acrylates such as bisphenol A ethyleneoxide-modified di(meth)acrylate and bisphenol F ethyleneoxide-modified di(meth)acrylate; and polyethylene glycol di(meth)acrylate, polypropylene glycol di(meth)acrylate, urethane di(meth)acrylate and epoxy di(meth)acrylate.

The tri- or higher-functional polyfunctional (meth)acrylates are not particularly limited. Examples of the polyfunctional (meth)acrylates include dipentaerythritol hexa(meth)acrylate, dipentaerythritol penta(meth)acrylate, pentaerythritol tetra(meth)acrylate, ditrimethylol propane tetra(meth)acrylate, pentaerythritol tri(meth)acrylate, trimethylol propane tri(meth)acrylate, tetramethylol methane ethyleneoxide-modified tetra(meth)acrylate, isocyanuric acid-modified tri(meth)acrylates such as isocyanuric acid ethyleneoxide-modified tri(meth)acrylate and ε-caprolactone-modified tris(acryloxyethyl)isocyanurate, and urethane acrylates such as a pentaerythritol triacrylate hexamethylene diisocyanate urethane prepolymer, a pentaerythritol triacrylate toluene diisocyanate urethane prepolymer and a dipentaerythritol pentaacrylate hexamethylene diisocyanate urethane prepolymer. Among these polyfunctional (meth)acrylates, from the standpoints of improving surface hardness and abrasion resistance of the coating layer, preferred are dipentaerythritol hexa(meth)acrylate and dipentaerythritol penta(meth)acrylate.

Reactive silica comprising the above (meth)acryloyl group is used in order to improve hardness of the resulting coating layer.

In general, when silica particles are added to a coating layer, the coating layer is deteriorated in transparency. Therefore, the amount of the silica particles must be limited, so that the resulting coating layer tends to be hardly improved in hardness thereof. Then, it was found that when using the reactive silica comprising a (meth)acryloyl group, it is possible to improve hardness of the coating layer without deterioration in transparency of the coating layer.

The reactive silica comprising a (meth)acryloyl group means silica particles that include a compound comprising a (meth)acryloyl group on at least a part of the surface thereof.

As the method of introducing the compound comprising a (meth)acryloyl group to the silica particles, there may be employed conventionally known methods without any particular limitation. For example, there may be mentioned a method in which a silane coupling agent comprising a (meth)acryloyl group and a silanol group present on the surface of the respective silica particles are reacted with each other.

As the compound comprising the (meth)acryloyl group, there may be mentioned those compounds similar to the (meth)acrylate compound used for forming the above-described coating layer.

As the silica particles, there may be used conventionally known silica particles without any particular limitation. Not only usual colloidal silica particles but also hollow silica particles and porous silica particles may be used. The average particle diameter of the silica particles is preferably in the range of not more than 300 nm, more preferably 10 to 200 nm, and even more preferably 15 to 100 nm. When the silica particles are used in the above-specified ranges, it is possible to obtain a coating layer having excellent transparency, surface hardness and abrasion resistance.

The above-described isocyanate-based compound are used for the purpose of improving adhesion between the coating layer and the polyester film. Further, the isocyanate-based compound has an isocyanurate structure, so that adhesion properties of the polyester film to the coating layer can be improved without considerably deteriorating the surface hardness and the abrasion resistance of the coating layer.

The isocyanurate structure is a structure having an isocyanurate group in a molecule thereof. The isocyanate-based compound having the isocyanurate structure is not particularly limited, and any suitable compounds conventionally known as the isocyanate-based compound having the isocyanurate structure may be used. For example, there is mentioned a trimer of an isocyanate-based compound.

The isocyanate-based compound means an isocyanate or a compound having an isocyanate derivative structure such as typically a blocked isocyanate. Examples of the isocyanate include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as α,α, α',α'-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. There also may be used a reaction product of these isocyanates and various polymers and compounds. These isocyanates may be used alone or in combination of any two or more thereof. Among these isocyanates, from the viewpoint of preventing occurrence of yellowing owing to ultraviolet radiation, aliphatic isocyanates and alicyclic isocyanates are more suitably used as compared to aromatic isocyanates.

When the isocyanate-based compound is used in the form of a blocked isocyanate, examples of blocking agents used for production thereof include active methylene based compounds, phenol-based compounds, mercaptan-based compounds, lactam-based compounds, amine-based compounds, amide compounds and oxime-based compounds. These blocking agents may be used alone or in combination of any two or more thereof. Among these compounds, from the standpoint of improving the adhesion properties to the polyester film, the active methylene-based compounds are preferred.

Examples of the active methylene-based blocking agent include an isobutanoyl acetic acid ester, an n-propanoyl acetic acid ester, an n-butanoyl acetic acid ester, an n-pentanoyl acetic acid ester, an n-hexanoyl acetic acid ester, a 2-ethyl-heptanoyl acetic acid ester, a malonic acid ester, an acetoacetic acid ester and acetyl acetone. Among these active methylene-based blocking agents, from the standpoints of an excellent low-temperature curability and an excellent storage stability even in the presence of water, preferred are an isobutanoyl acetic acid ester, an n-propanoyl acetic acid ester, an n-butanoyl acetic acid ester, an n-pentanoyl acetic acid ester, an n-hexanoyl acetic acid ester and a 2-ethyl-heptanoyl acetic acid ester; more preferred are an isobutanoyl acetic acid ester, an n-propanoyl acetic acid ester and an n-pentanoyl acetic acid ester; and even more preferred is an isobutanoyl acetic acid ester. Specific examples of the isobutanoyl acetic acid enter include methyl isobutanoyl acetate, ethyl isobutanoyl acetate, n-propyl isobutanoyl acetate, isopropyl isobutanoyl acetate, n-butyl isobutanoyl acetate, isobutyl isobutanoyl acetate, t-butyl isobutanoyl acetate, n-pentyl isobutanoyl acetate, n-hexyl isobutanoyl acetate, 2-ethylhexyl isobutanoyl acetate, phenyl isobutanoyl acetate and benzyl isobutanoyl acetate. Among these isobutanoyl acetic acid esters, preferred are methyl isobutanoyl acetate and ethyl isobutanoyl acetate. Specific examples of the n-propanoyl acetic acid ester include methyl n-propanoyl acetate, ethyl n-propanoyl acetate, isopropyl n-propanoyl acetate, n-butyl n-propanoyl acetate and t-butyl n-propanoyl acetate. Among these n-propanoyl acetic acid esters, preferred are methyl n-propanoyl acetate and ethyl n-propanoyl acetate. Specific examples of the n-pentanoyl acetic acid ester include methyl n-pentanoyl acetate, ethyl n-pentanoyl acetate, isopropyl n-pentanoyl acetate, n-butyl n-pentanoyl acetate and t-butyl n-pentanoyl acetate. Among these n-pentanoyl acetic acid esters, preferred are methyl n-pentanoyl acetate and ethyl n-pentanoyl acetate.

In addition, the isocyanate-based compounds in the present invention may be used in the form of a single substance or in the form of a mixture with various polymers or a bonded product therewith. The isocyanate-based compounds may also be used in the form of a mixture or a bonded product with polyester resins or polyurethane resins from the standpoint of improving a dispersibility or a crosslinkability of the isocyanate-based compounds.

The above-described acrylic resin is used in order to improve transparency and appearance of the coating layer.

As described above, the isocyanate-based compounds used to form the coating layer are used in older to improve adhesion between the coating layer and the polyester film. However, it was found that the resulting film is deteriorated in transparency and appearance with the use of the isocyanate-based compounds. Therefore, as a result of the present inventors' earnest study in view of the above problem, it has been found that the problem can be solved by using an acrylic resin in combination with the above-described components, and the resulting film can be improved in transparency and appearance.

The acrylic resin is in the form of a polymer obtained from a polymerizable monomer comprising an acrylic monomer and a methacrylic monomer. The polymer may be any of a homopolymer, a copolymer, and a polymerizable monomer other than the acrylic monomer and the methacrylic monomer. The polymer may also include a copolymer of these polymers with the other polymer (such as, for example, a polyester and a polyurethane). Examples of the copolymer include a block copolymer and a graft copolymer. In addition, the polymer may also include a polymer obtained by polymerizing the polymerizable monomer in a polyester solution or a polyester dispersion (which may also be in the form of a mixture of the polymers). Further, the polymer may also include a polymer obtained by polymerizing the polymerizable monomer in a polyurethane solution or a polyurethane dispersion (which may also be in the form of a mixture of the polymers). In addition, the polymer may also include a polymer obtained by polymerizing the polymerizable monomer in the other polymer solution or the other polymer dispersion (which may also be in the form of a mixture of the polymers).

The above polymerizable monomer is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth)acrylate and lauryl (meth)acrylate; various nitrogen-containing compounds such as (meth) acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride and vinylidene chloride; and various conjugated dienes such as butadiene. Among these compounds, from the standpoints of improving transparency and coating appearance, preferred are the nitrogen-containing compounds, and more preferred is the N-methylol acrylamide.

The content of the nitrogen-containing compound in the acrylic resin is preferably 1 to 50 mol %, and more preferably 1 to 20 mol % and even more preferably 1 to 10 mol %.

Various polymers other than the acrylic resin can also be used to form the coating layer for enhancing coating appearance, transparency and adhesion properties to the polyester film. However, when the amount of the polymers compounded in the coating layer is too large, there tends to occur deterioration in surface hardness and abrasion resistance of the coating layer.

Specific examples of the polymers include polyurethane resins, polyester resins, polyvinyl resins (such as polyvinyl alcohol), polyalkylene glycols, polyalkylene imines, methyl cellulose, hydroxy cellulose, starches, etc.

The polyurethane resin is a high-molecular compound having a urethane bond in a molecule thereof. The polyurethane resin is usually produced by the reaction between a polyol and an isocyanate. Examples of the polyol include polyester polyols, polycarbonate polyols, polyether polyols, polyolefin polyols and acrylic polyols. These compounds may be used alone or in combination of any two or more thereof.

Examples of the polyester polyols include those compounds produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1, 3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol), as well as those compounds having a derivative unit of a lactone compound such as polycaprolactone.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1, 5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyether polyols include polyethylene glycol, polypropylene glycol, polyethylene/propylene glycol, polytetramethylene ether glycol and polyhexamethylene ether glycol.

Examples of an isocyanate compound used for obtaining the polyurethane resin include compounds such as the above-described isocyanate-based compounds.

When the polyurethane resin is synthesized, there may be used a chain extender. The chain extender is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

In addition, upon forming the coating layer, a crosslinking agent other than the isocyanate-based compound can also be used for improving coating appearance, transparency or strength of the coating layer.

Examples of the crosslinking agent include a melamine compound, an oxazoline compound, a carbodiimide-based compound, an epoxy compound and a silane coupling compound, etc.

The melamine compound is a compound having a melamine structure therein. Examples of the melamine compound include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by subjecting a urea or the like to co-condensation with a part of melamine. Further, a catalyst may also be used to enhance reactivity of the melamine compound.

The oxazoline compound is a compound having an oxazoline group in a molecule thereof. As the oxazoline compound, especially preferred are polymers having an oxazoline group which may be in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of industrial availability thereof. The other monomers used in the copolymer are not particularly limited as long as they are monomers that are copolymerizable with the addition-polymerizable oxazoline group-containing monomer. Examples of the other monomers include (meth) acrylic acid esters such as alkyl (meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl (meth)acrylamides and N,N-dialkyl (meth) acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The carbodiimide-based compound is a compound having a carbodiimide structure. The carbodiimide-based compound is in the form of a compound having one or more carbodiimide structures in a molecule thereof, and the preferred carbodiimide-based compound is a polycarbodiimide-based compound having two or more carbodiimide structures in a molecule thereof in view of good adhesion properties or the like of the resulting coating layer.

The carbodiimide-based compound may be synthesized by conventionally known techniques. In general, the carbodiimide-based compound may be obtained by a condensation reaction of a diisocyanate compound. The diisocyanate compound is not particularly limited, and may be either an aromatic diisocyanate or an aliphatic diisocyanate. Specific examples of the diisocyanate compound include tolylene diisocyanate, xylene diisocyanate, diphenylmethane diisocyanate, phenylene diisocyanate, naphthalene diisocyanate, hexamethylene diisocyanate, trimethyl hexamethylene diisocyanate, cyclohexane diisocyanate, methyl cyclohexane diisocyanate, isophorone diisocyanate, dicyclohexyl diisocyanate and dicyclohexylmethane diisocyanate.

Further, in order to improve water solubility or water dispersibility of the polycarbodiimide-based compound, a surfactant or a polyalkyleneoxide, a quaternary ammonium salt of a dialkylamino alcohol, a hydroxyalkyl sulfonic acid salt, etc., may also be added thereto unless the addition thereof eliminates the effects of the present invention.

The content of a carbodiimide group in the carbodiimide-based compound is usually in the range of 100 to 1000, preferably 250 to 800, more preferably 300 to 700, and even more preferably 350 to 650, in terms of a carbodiimide equivalent (a weight [g] of the carbodiimide-based compound providing 1 mol of a carbodiimide group).

As the epoxy compound, there may be mentioned, for example, a compound having an epoxy group in a molecule thereof, and a prepolymer and a cured product of such a compound. Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

Meanwhile, these crosslinking agents are used for improving a performance of the coating layer by allowing the crosslinking agents to react with the compounds contained therein during a drying step or a film-forming step thereof. Therefore, it is estimated that the resulting coating layer comprises the unreacted crosslinking agent, compounds obtained after the reaction, or a mixture thereof.

Also, upon forming the coating layer, for the purpose of improving anti-blocking properties and slipping properties of the coating layer, particles other than the reactive silica comprising a (meth)acryloyl group may also be used.

The average particle diameter of the particles is preferably in the range of not more than 1.0 µm, more preferably not more than 0.5 µm, and even more preferably not more than 0.2 µm from the viewpoint of good transparency of the resulting film.

Specific examples of the particles used include inorganic particles such as particles of silica, alumina, metal oxides, etc., or organic particles such as particles of crosslinked polymers or the like.

Further, upon forming the coating layer, various additives such as a defoaming agent, a coatability improver, a thickening agent, an organic lubricant, an antistatic agent, an ultraviolet absorber, an antioxidant, a foaming agent, a dye and a pigment may also be used, if required, unless the subject matter of the present invention is adversely affected by addition thereof to the coating layer.

The content of the (meth)acrylate compound in the coating solution (the content based on a total amount of whole non-volatile components in the coating solution) preferably lies in the range of 10 to 95% by weight, more preferably 30 to 90% by weight and even more preferably 40 to 80% by weight. When the content of the (meth)acrylate compound in the coating solution lies in the above-specified range, it is possible to obtain the coating layer that is excellent in surface hardness and abrasion resistance.

The content of the reactive silica comprising a (meth)acryloyl group in the coating solution (the content based on a total amount of whole non-volatile components in the coating solution) preferably lies in the range of 1 to 60% by weight, more preferably 5 to 45% by weight and even more preferably 10 to 40% by weight. When the content of the reactive silica comprising a (meth)acryloyl group in the coating solution lies in the above-specified range, it is possible to obtain the coating layer that is excellent in surface hardness, abrasion resistance, transparency and coating appearance.

The content of the isocyanate-based compounds in the coating solution (the content based on a total amount of whole non-volatile components in the coating solution) preferably lies in the range of 1 to 60% by weight, more preferably 5 to 40% by weight and even more preferably 10 to 25% by weight. When the content of the isocyanate-based compounds in the coating solution lies in the above-specified range, it is possible to obtain the coating layer that is excellent in surface hardness, abrasion resistance, and adhesion properties to the polyester film.

When the isocyanate-based compounds have an isocyanurate structure, the content of the isocyanurate structure in the isocyanate-based compounds preferably lies in the range of 0.2 to 12% by weight, more preferably 0.3 to 8% by weight and even more preferably 0.5 to 5% by weight. When the content of the isocyanurate structure in the isocyanate-based compounds lies in the above-specified range, it is possible to obtain the coating layer that is excellent in surface hardness, abrasion resistance and adhesion properties to the polyester film.

The content of the acrylic resins in the coating solution (the content based on a total amount of whole non-volatile components in the coating solution) preferably lies in the range of 0.01 to 30% by weight, more preferably 0.1 to 20% by weight and even more preferably 1 to 10% by weight. When the content of the acrylic resins in the coating solution lies in the above-specified range, it is possible to obtain the coating layer that is excellent in surface hardness, abrasion resistance, transparency and coating appearance.

The coated film of the present invention may also be provided, on a surface opposed to the surface of the polyester film on which the above coating layer is formed, with a further coating layer. Examples of materials used in the further coating layer formed on the opposite surface of the polyester film include polymers such as polyester resins, acrylic resins and polyurethane resins, crosslinking agents such as oxazoline-based compounds, epoxy-based compounds, melamine-based compounds and isocyanate-based compounds, carbodiimide-based compound, and the like. These materials may be respectively used alone or in combination of any two or more thereof. In addition, the further coating layer may be a coating layer that is prepared from a coating solution comprising the (meth)acrylate compound, the reactive silica comprising a (meth)acryloyl group, and the isocyanate-based compounds as described above (i.e., the same coating layer may be formed on opposite surfaces of the polyester film).

The analysis of the respective components included in the coating layer may be conducted, for example, by analysis methods such as TOF-SIMS, ESCA and fluorescent X-ray analysis.

When forming the coating layer by an in-line coating method, the coated film is preferably produced by the method in which an aqueous solution or a water dispersion comprising a series of the above-described compounds is prepared as a coating solution having a concentration of about 0.1 to about 50% by weight in terms of a solid content thereof, and the thus prepared coating solution is applied onto the polyester film. The coating solution may also comprise an organic solvent for the purpose of improving dispersibility in water, film-forming properties, etc., unless the subject matter of the present invention is adversely affected thereby. The organic solvent may be used alone, or two or more organic solvents may be appropriately used in the form of a mixture thereof.

The thickness of the coating layer is preferably in the range of 0.1 to 10 µm, more preferably 0.6 to 3.0 µm, and even more preferably 0.8 to 2.0 µm. When the thickness of the coating layer is in the above-specified range, it is possible to obtain the coating layer that is excellent in surface hardness, abrasion resistance, and adhesion properties to the polyester film.

The haze of the coated film of the present invention is preferably not more than 5.0%, more preferably not more than 2.0%, and even more preferably not more than 1.0%. When the haze of the coated film lies in the above-specified range, the resulting film can be suitably used in various applications.

The haze (haze difference) of the coating layer is preferably not more than 1.0%, more preferably not more than 0.5%, and even more preferably not more than 0.2%. When the haze (haze difference) of the coating layer lies in the above-specified range, the resulting coating layer can be suitably used in various applications.

Examples of the coating method of applying the coating solution onto the polyester film include conventionally known coating methods such as a gravure coating method, a reverse roll coating method, a die coating method, an air doctor coating method, a blade coating method, a rod coating method, a bar coating method, a curtain coating method, a knife coating method, a transfer roll coating method, squeeze coating method, an impregnation coating method, a kiss roll coating method, a spray coating method, a calender coating method and an extrusion-coating method.

In the present invention, the drying and curing conditions used upon forming the coating layer on the polyester film are not particularly limited. For example, when the coating layer is formed by an off-line coating method, the coating solution applied onto the polyester film may be subjected to heat setting treatment usually at a temperature of 80 to 200° C. for 3 to 40 sec and preferably at a temperature of 100 to 180° C. for 3 to 40 sec.

When the coating layer is formed by an in-line coating method, the method in which the monoaxially drawn film obtained by drawing the undrawn sheet in a longitudinal direction (length direction) thereof is subjected to the coating step, and then the resulting coated monoaxially drawn film is further drawn in a lateral direction thereof is more excellent as described above. In this case, the film is subjected to preheating and drying treatments preferably at a temperature of 60 to 150° C., more preferably 70 to 130° C., and even more preferably 75 to 120° C., and then subjected to drawing preferably at a temperature of 70 to 170° C., more preferably 80 to 160° C., and even more preferably 90 to 140° C. The drawn film is further subjected to heat setting treatment preferably at a temperature of 180 to 270° C., more preferably 190 to 260° C., and even more preferably 200 to 250° C. When the film-forming step and the coating layer-forming step are conducted at the above-specified ranges, the polyester film having excellent mechanical properties can be obtained, and at the same time, the coating layer having excellent surface hardness, abrasion resistance and adhesion properties to the polyester film can be obtained.

In addition, the polyester film constituting the coated film of the present invention may be previously subjected to surface treatments, corona discharge treatment, plasma treatment, etc., before coated.

EXAMPLES

The present invention is described in more detail below by Examples. However, these Examples are only illustrative and not intended to limit the present invention thereto, and other modifications are also possible unless they depart from the scope of the present invention. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight radio of 50:50, and a viscosity of the resulting solution was measured at 30° C.

(2) Method of Measuring Average Particle Diameter:

Using TEM ("H-7650" manufactured by Hitachi High-Technologies Corporation; accelerated voltage: 100 kV), the coating layer was observed to measure particle diameters of 10 particles therein and calculate an average particle diameter thereof from the measured values.

(3) Method of Measuring Thickness of Coating Layer:

The coated film was embedded in an epoxy resin, and then, the resin-embedded film was cut into a piece in a thickness direction of the coating layer by an ultrathin sectioning method. The cut section of the coating layer was observed using SEM ("S-4300N" manufactured by Hitachi High-Technologies Corporation; accelerated voltage: 15 kV) to measure a thickness of the coating layer at 10 portions thereof and calculate an average value of the measured values as the thickness of the coating layer.

(4) Method for Evaluating Adhesion Properties:

The coating layer of the coated film was cut by a cutter knife to form flaws thereon at intervals of 5 mm. Then, a 24 mm-wide tape ("Cellotape (registered trademark) CT-24" produced by Nichiban Co., Ltd.) was attached onto the thus cut surface of the coating layer, and then rapidly peeled off therefrom at a peel angle of 180° (adhesion 1). The coating layer of the coated film that had been treated at a temperature of 80° C. and a humidity of 90% RH for 48 hr was evaluated in the same method as described above (adhesion 2). Then, the surface of the coating layer from which the tape was peeled off was observed to measure an area of the layer peeled off together with the tape. The evaluation ratings are as follows.

A: Peeled area of the layer was not more than 5%.

B: Peeled area of the layer was more than 5% but not more than 10%.

C: Peeled area of the layer was more than 10% but not more than 25%.

D: Peeled area of the layer was more than 25%.

(5) Method for Measuring Pencil Hardness:

The pencil hardness of the sample film was measured according to JIS K5600-5-4 except that the load applied thereto was changed to 500 g.

The pencil hardness of F or more is practically preferred.

(6) Abrasion Resistance:

A surface of the sample film was rubbed at a test load of 200 g with steel wool #0000 (by 10 reciprocative motions) using a color fastness rubbing tester ("AB-301" manufactured by Tester Sangyo Co., Ltd.) and was observed to measure the abrasion resistance. The evaluation ratings are as follows.

A: No scratches was found.

B: Number of scratches was in the range of 1 to 5.

C: Number of scratches was more than 6.

The evaluation rating higher than the rank "A" is practically preferred.

(7) Haze:

The haze of the single sample film was measured using a haze meter ("HM-150" manufactured by Murakami Color Research Laboratory Co., Ltd.), according to JIS K 7136.

(8) Haze Difference:

The measurement of the haze of the sample film was similarly conducted, and the haze difference between the sample films was calculated as follows.

Haze difference=(haze of polyester film with coating layer)−(haze of polyester film with no coating layer)

(9) Appearance of Coated Film:

The coated film was observed to evaluate an appearance thereof from the side of the coating layer using a halogen light ("NIGHT BLASTER QH-2000"). The evaluation ratings are as follows.

A: Coating unevenness was not recognized.
B: Coating unevenness was slightly recognized but hardly visible.
C: Coating unevenness was clearly recognized with the halogen light and was slightly recognized with a fluorescent light.
D: Coating unevenness was clearly recognized with both the halogen light and the fluorescent lamp.

The polyesters used in the respective Examples and Comparative Examples were prepared by the following methods.

<Method for Producing Polyester (A)>

One hundred parts by weight of dimethyl terephthalate and 60 parts by weight of ethylene glycol as well as ethyl acid phosphate and magnesium acetate tetrahydrate as a catalyst in amounts of 30 ppm and 100 ppm, respectively, based on the polyester as produced, were subjected to esterification reaction at 260° C. in a nitrogen atmosphere. Successively, tetrabutyl titanate in an amount of 50 ppm based on the polyester as produced was added to the reaction solution. While heating the resulting mixture to 280° C. over 2 hr and 30 min, the pressure of the reaction system was reduced to an absolute pressure of 0.3 kPa, and further the mixture was subjected to melt-polycondensation for 80 min, thereby obtaining a polyester (A) having an intrinsic viscosity of 0.63.

<Method for Producing Polyester (B)>

One hundred parts by weight of dimethyl terephthalate and 60 parts by weight of ethylene glycol as well as magnesium acetate tetrahydrate as a catalyst in an amount of 900 ppm based on the polyester as produced, were subjected to esterification reaction at 225° C. in a nitrogen atmosphere. Successively, orthophosphoric acid and germanium dioxide in amounts of 3500 ppm and 70 ppm, respectively, based on the polyester as produced, were added to the reaction solution. While heating the resulting mixture to 280° C. over 2 hr and 30 min, the pressure of the reaction system was reduced to an absolute pressure of 0.4 kPa, and further the mixture was subjected to melt-polycondensation for 85 min, thereby obtaining a polyester (B) having an intrinsic viscosity of 0.64.

<Method for Producing Polyester (C)>

The same procedure as used in the above method for producing the polyester (A) was conducted except that silica particles having an average particle diameter of 2 μm were added in an amount of 0.3 part by weight before the melt-polycondensation, thereby obtaining a polyester (C).

Examples of the compounds used for forming the coating layer are as follows.

(Examples of Compounds)

(Meth)Acrylate Compound: (I)

Water dispersion obtained by mixing and stirring 100 parts of a mixture comprising 30% by weight of dipentaerythritol pentaacrylate and 70% by weight of dipentaerythritol hexaacrylate, 5 parts of a polyalkyleneoxide-based surfactant and 230 parts of ion-exchanged water, and then treating the resulting mixture using an ultrasonic disperser and a high-pressure homogenizer.

Reactive Silica Particles Comprising a (Meth)Acryloyl Group: (II)

Colloidal silica having an average particle diameter of 30 nm whose surface was modified with 3-methacryloxypropyl trimethoxysilane.

Compound Having Isocyanurate Structure: (IIIA)

(I) Blocked Polyisocyanate Produced by the Following Method:

One thousand parts by weight of hexamethylene diisocyanate were stirred at 60° C., and 0.1 part by weight of tetramethyl ammonium caprylate as a catalyst was added thereto. After 4 hr, 0.2 part by weight of phosphoric acid was added to the reaction solution to terminate the reaction, thereby obtaining an isocyanurate-type polyisocyanate composition. One hundred parts by weight of the thus obtained isocyanurate-type polyisocyanate composition, 42.3 parts by weight of methoxy polyethylene glycol having a number-average molecular weight of 400 and 29.5 parts by weight of propylene glycol monomethyl ether acetate were charged into a reactor and held therein at 80° C. for 7 hr. Thereafter, while the resulting reaction solution was held at 60° C., 35.8 parts by weight of methyl isobutanoyl acetate, 32.2 parts by weight of diethyl malonate and 0.88 part by weight of a 28% methanol solution of sodium methoxide were added thereto, followed by allowing the resulting mixture to stand for 4 hr. In addition, 58.9 parts by weight of n-butanol was added to the mixture, and then the resulting reaction solution was held at 80° C. for 2 hr, and thereafter 0.86 part by weight of 2-ethylhexyl acid phosphate was added thereto, thereby obtaining a blocked polyisocyanate. Content of isocyanurate structure=6.2% by weight.

Compound Having Isocyanurate Structure: (IIIB)

(I) Blocked Polyisocyanate Produced by the Following Method:

One thousand parts by weight of hexamethylene diisocyanate were stirred at 60° C., and 0.1 part by weight of tetramethyl ammonium caprylate as a catalyst was added thereto. After 4 hr, 0.2 part by weight of phosphoric acid was added to the reaction solution to terminate the reaction, thereby obtaining an isocyanurate-type polyisocyanate composition. One hundred parts by weight of the thus obtained isocyanurate-type polyisocyanate composition, 42.3 parts by weight of methoxy polyethylene glycol having a number-average molecular weight of 200 and 29.5 parts by weight of propylene glycol monomethyl ether acetate were charged into a reactor and held therein at 80° C. for 7 hr. Thereafter, while the resulting reaction solution was held at 60° C., 35.8 parts by weight of methyl isobutanoyl acetate, 32.2 parts by weight of diethyl malonate and 0.88 part by weight of a 28% methanol solution of sodium methoxide were added thereto, followed by allowing the resulting mixture to stand for 4 hr. In addition, 58.9 parts by weight of n-butanol was added to the mixture, and then the resulting reaction solution was held at 80° C. for 2 hr, and thereafter 0.86 part by weight of 2-ethylhexyl acid phosphate was added thereto, thereby obtaining a blocked polyisocyanate. Content of isocyanurate structure=6.9% by weight.

Compound Having Isocyanurate Structure: (IIIC)

(I) Blocked Polyisocyanate Produced by the Following Method:

One thousand parts by weight of hexamethylene diisocyanate were stirred at 60° C., and 0.1 part by weight of tetramethyl ammonium caprylate as a catalyst was added thereto. After 4 hr, 0.2 part by weight of phosphoric acid was added to the reaction solution to terminate the reaction, thereby obtaining an isocyanurate-type polyisocyanate composition. One hundred parts by weight of the thus obtained isocyanurate-type polyisocyanate composition, 42.3 parts by weight of methoxy polyethylene glycol having a number-average molecular weight of 1000 and 29.5 parts by weight of propylene glycol monomethyl ether acetate were charged into a reactor and held therein at 80° C. for 7 hr. Thereafter, while the resulting reaction solution was held at 60° C., 35.8 parts by weight of methyl isobutanoyl acetate, 32.2 parts by weight of diethyl malonate and 0.88 part by weight of a 28% methanol solution of sodium methoxide were added thereto, followed by allowing the resulting mixture to stand for 4 hr. In addition, 58.9 parts by weight of n-butanol was added to the mixture, and then the resulting reaction solution was held at 80° C. for 2 hr, and thereafter 0.86 part by weight of 2-ethylhexyl acid phosphate was added thereto, thereby obtaining a blocked polyisocyanate. Content of isocyanurate structure=4.7% by weight.

Acrylic Resin: (IVA)

Water dispersion of an acrylic resin comprising methyl methacrylate, ethyl methacrylate, ethyl acrylate, acrylonitrile, N-methylol acrylamide, acrylic acid at a ratio of 40:22:21:10:3:4 (mol %) (emulsifier: anionic surfactant).

Acrylic Resin: (IVB)

Water dispersion of an acrylic resin comprising ethyl acrylate, n-butyl acrylate, methyl methacrylate, N-methylol acrylamide, acrylic acid at a ratio of 67:17:10:2:4 (mol %) (emulsifier: anionic surfactant).

Acrylic Resin: (IVC)

Water dispersion of an acrylic resin comprising methyl methacrylate, ethyl methacrylate, ethyl acrylate, acrylonitrile, acrylic acid at a ratio of 43:22:21:10:4 (mol %) (emulsifier: anionic surfactant).

Silica Particles Comprising No Reactive Group: (V)

Colloidal silica having an average particle diameter of 30 nm

Melamine Compound: (VIA)

Hexamethoxymethylol melamine

Oxazoline Compound: (VIB)

Acrylic polymer comprising an oxazoline group and a polyalkyleneoxide chain. Oxazoline group content=4.5 mmol/g.

Epoxy Compound: (VIC)

Polyglycerol polyglycidyl ether.

Polyurethane Resin: (VIIA)

Water dispersion of a polyester-based polyurethane resin comprising tolylene diisocyanate, terephthalic acid, isophthalic acid, ethylene glycol, neopentyl glycol and dimethylol propionic acid at a ratio of 14:17:17:23:24:5 (mol %).

Polyester Resin: (VIIB)

Water dispersion of a polyester resin comprising a monomer composition: (acid component) terephthalic acid/isophthalic acid/5-sodium sulfoisophthalic acid//(diol component) ethylene glycol/1,4-butanediol/diethylene glycol at a ratio of 56/40/4//70/20/10 (mol %).

Example 1

A mixed raw material obtained by mixing the polyesters (A), (B) and (C) in amounts of 89%, 5% and 6%, respectively, as a raw material for outermost layers (surface layers), and a mixed raw material obtained by mixing the polyesters (A) and (B) in amounts of 95% and 5%, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=1:18:1 as output), followed by cooling and solidifying the thus co-extruded sheet on the chilled roll, thereby obtaining an undrawn sheet.

Next, the thus obtained undrawn sheet was drawn utilizing a difference between peripheral speeds of rolls at a sheet temperature of 85° C. at a draw ratio of 3.4 times in a longitudinal direction thereof. Thereafter, a coating solution 1 shown in the below-mentioned Table 1 was applied on both surfaces of the thus obtained longitudinally drawn sheet. Then, the resulting coated sheet was introduced into a tenter where the sheet was drawn at 120° C. at a draw ratio of 4.0 times in a lateral direction thereof and then heat-set at 225° C. Thereafter, the obtained drawn sheet was relaxed by 2% in a lateral direction thereof, thereby obtaining a polyester film having a thickness of 125 μm which was provided on both surfaces thereof with a coating layer having a thickness of 0.7 μm (after being dried). As a result of evaluating the thus obtained coated film, it was confirmed that the film was excellent in adhesion properties to the base material of the film, pencil hardness, abrasion resistance, haze, and haze difference. Various properties of the film are shown in Table 2 below.

Examples 2 to 22

The same procedure as in Example 1 was conducted except that the coating agent composition was changed to those shown in Tables 1, thereby obtaining polyester films. As a result of evaluating the thus obtained polyester films, it was confirmed that the properties of the polyester films were as shown in Table 2, i.e., the polyester films were excellent in adhesion properties, pencil hardness, abrasion resistance, haze and haze difference.

Comparative Examples 1 to 13

The same procedure as in Example 1 was conducted except that the coating agent composition was changed to those shown in Table 1, thereby obtaining polyester films. As a result of evaluating the thus obtained coated films, it was confirmed that properties of the coated films were as shown in Table 2, i.e., the coated films were inferior in any of adhesion properties to the polyester film, pencil hardness, abrasion resistance, haze and haze difference.

TABLE 1

| Coating solutions | Coating agent composition (wt %) | | | | | | |
|---|---|---|---|---|---|---|---|
| | I | II | IIIA | IIIB | IIIC | IVA | IVB |
| 1 | 70 | 20 | 10 | 0 | 0 | 0 | 0 |
| 2 | 55 | 15 | 30 | 0 | 0 | 0 | 0 |
| 3 | 75 | 20 | 5 | 0 | 0 | 0 | 0 |
| 4 | 45 | 45 | 10 | 0 | 0 | 0 | 0 |
| 5 | 85 | 5 | 10 | 0 | 0 | 0 | 0 |
| 6 | 70 | 20 | 0 | 10 | 0 | 0 | 0 |
| 7 | 70 | 20 | 0 | 0 | 10 | 0 | 0 |
| 8 | 65 | 20 | 10 | 0 | 0 | 5 | 0 |
| 9 | 70 | 20 | 5 | 0 | 0 | 5 | 0 |
| 10 | 50 | 15 | 30 | 0 | 0 | 5 | 0 |
| 11 | 69 | 20 | 10 | 0 | 0 | 1 | 0 |

TABLE 1-continued

| | | | | | | | |
|---|---|---|---|---|---|---|---|
| 12 | 58 | 17 | 10 | 0 | 0 | 15 | 0 |
| 13 | 45 | 40 | 10 | 0 | 0 | 5 | 0 |
| 14 | 80 | 5 | 10 | 0 | 0 | 5 | 0 |
| 15 | 65 | 20 | 10 | 0 | 0 | 0 | 5 |
| 16 | 65 | 20 | 10 | 0 | 0 | 0 | 0 |
| 17 | 100 | 0 | 0 | 0 | 0 | 0 | 0 |
| 18 | 73 | 22 | 0 | 0 | 0 | 5 | 0 |
| 19 | 65 | 0 | 10 | 0 | 0 | 5 | 0 |
| 20 | 65 | 20 | 0 | 0 | 0 | 5 | 0 |
| 21 | 65 | 20 | 0 | 0 | 0 | 5 | 0 |
| 22 | 65 | 20 | 0 | 0 | 0 | 5 | 0 |
| 23 | 65 | 20 | 10 | 0 | 0 | 0 | 0 |
| 24 | 65 | 20 | 10 | 0 | 0 | 0 | 0 |
| 25 | 75 | 25 | 0 | 0 | 0 | 0 | 0 |
| 26 | 70 | 0 | 10 | 0 | 0 | 0 | 0 |
| 27 | 70 | 20 | 0 | 0 | 0 | 0 | 0 |
| 28 | 70 | 20 | 0 | 0 | 0 | 0 | 0 |
| 29 | 70 | 20 | 0 | 0 | 0 | 0 | 0 |

| Coating | Coating agent composition (wt %) | | | | | | |
|---|---|---|---|---|---|---|---|
| solutions | IVC | V | VIA | VIB | VIC | VIIA | VIIB |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 5 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 20 | 0 | 0 | 0 | 0 | 0 |
| 20 | 0 | 0 | 10 | 0 | 0 | 0 | 0 |
| 21 | 0 | 0 | 0 | 10 | 0 | 0 | 0 |
| 22 | 0 | 0 | 0 | 0 | 10 | 0 | 0 |
| 23 | 0 | 0 | 0 | 0 | 0 | 5 | 0 |
| 24 | 0 | 0 | 0 | 0 | 0 | 0 | 5 |
| 25 | 0 | 0 | 0 | 0 | 0 | 0 | 0 |
| 26 | 0 | 20 | 0 | 0 | 0 | 0 | 0 |
| 27 | 0 | 0 | 10 | 0 | 0 | 0 | 0 |
| 28 | 0 | 0 | 0 | 10 | 0 | 0 | 0 |
| 29 | 0 | 0 | 0 | 0 | 10 | 0 | 0 |

TABLE 2

| Examples and Comparative Examples | Coating solution | Thickness (μm) | Adhesion 1 | Adhesion 2 |
|---|---|---|---|---|
| Example 1 | 1 | 0.7 | A | A |
| Example 2 | 1 | 1 | A | A |
| Example 3 | 1 | 2 | A | A |
| Example 4 | 1 | 2.5 | A | B |
| Example 5 | 2 | 1 | A | A |
| Example 6 | 3 | 1 | A | B |
| Example 7 | 4 | 1 | A | A |
| Example 8 | 5 | 1 | A | A |
| Example 9 | 6 | 1 | A | A |
| Example 10 | 7 | 1 | A | B |
| Example 11 | 8 | 0.7 | A | A |
| Example 12 | 8 | 1 | A | A |
| Example 13 | 8 | 2 | A | A |
| Example 14 | 8 | 2.5 | A | B |
| Example 15 | 9 | 1 | A | B |
| Example 16 | 10 | 1 | A | A |
| Example 17 | 11 | 1 | A | A |
| Example 18 | 12 | 1 | A | A |
| Example 19 | 13 | 1 | A | A |
| Example 20 | 14 | 1 | A | A |
| Example 21 | 15 | 1 | A | A |
| Example 22 | 16 | 1 | A | A |
| Comp. Ex. 1 | 17 | 1 | D | D |
| Comp. Ex. 2 | 18 | 1 | D | D |
| Comp. Ex. 3 | 19 | 1 | A | A |
| Comp. Ex. 4 | 20 | 1 | A | C |
| Comp. Ex. 5 | 21 | 1 | A | A |
| Comp. Ex. 6 | 22 | 1 | D | D |
| Comp. Ex. 7 | 23 | 1 | A | A |
| Comp. Ex. 8 | 24 | 1 | A | C |
| Comp. Ex. 9 | 25 | 1 | D | D |
| Comp. Ex. 10 | 26 | 1 | A | A |
| Comp. Ex. 11 | 27 | 1 | A | C |
| Comp. Ex. 12 | 28 | 1 | A | A |
| Comp. Ex. 13 | 29 | 1 | D | D |

| Examples and Comparative Examples | Pencil hardness | Adhesion resistance | Haze (%) | Haze difference (%) | Appearance |
|---|---|---|---|---|---|
| Example 1 | F | B | — | 0.0 | — |
| Example 2 | H | A | — | 0.1 | — |
| Example 3 | H | A | — | 0.2 | — |
| Example 4 | H | A | 1.1 | 0.3 | C |
| Example 5 | H | B | — | 0.1 | — |
| Example 6 | H | A | — | 0.1 | — |
| Example 7 | H | A | — | 0.3 | — |
| Example 8 | F | B | — | 0.1 | — |
| Example 9 | H | A | — | 0.1 | — |
| Example 10 | F | B | — | 0.1 | — |
| Example 11 | F | B | 0.8 | 0.0 | A |
| Example 12 | H | A | 0.8 | 0.0 | A |
| Example 13 | H | A | 0.9 | 0.1 | A |
| Example 14 | H | A | 0.9 | 0.1 | B |
| Example 15 | H | A | 0.8 | 0.0 | A |
| Example 16 | H | B | 0.8 | 0.0 | A |
| Example 17 | H | A | 0.9 | 0.1 | A |
| Example 18 | H | B | 0.8 | 0.0 | A |
| Example 19 | H | A | 1 | 0.2 | A |
| Example 20 | F | B | 0.8 | 0.0 | A |
| Example 21 | H | A | 0.8 | 0.0 | A |
| Example 22 | H | A | 0.9 | 0.1 | B |
| Comp. Ex. 1 | H | B | 0.8 | 0.0 | B |
| Comp. Ex. 2 | H | A | 0.9 | 0.1 | A |
| Comp. Ex. 3 | H | A | 8.8 | 8.0 | D |
| Comp. Ex. 4 | H | A | 0.9 | 0.1 | A |
| Comp. Ex. 5 | B | C | 1.1 | 0.3 | B |
| Comp. Ex. 6 | 2B | C | 0.9 | 0.1 | A |
| Comp. Ex. 7 | H | A | 3.4 | 2.6 | D |
| Comp. Ex. 8 | H | A | 3.1 | 2.3 | C |
| Comp. Ex. 9 | H | A | — | 0.1 | — |
| Comp. Ex. 10 | H | A | — | 10.5 | — |
| Comp. Ex. 11 | H | A | — | 0.1 | — |
| Comp. Ex. 12 | B | C | — | 0.3 | — |
| Comp. Ex. 13 | 2B | C | — | 0.1 | — |

INDUSTRIAL APPLICABILITY

The film of the present invention can be suitably used in the applications in which good surface hardness, good abrasion resistance and good adhesion between a coating layer and a polyester film are required, such as, for example, a base material for an ITO film of touch panels.

The invention claimed is:
1. A coated film comprising:
  a polyester film, and
  a coating layer which is formed on at least one surface of the polyester film and prepared from a coating solution, wherein non volatile components of the coating solution consist solely of:
  at least one (meth)acrylate compound,
  a reactive silica comprising a (meth)acryloyl group, and at least one blocked isocyanate in which the blocking agent is an active methylene-based compound.

2. The coated film according to claim 1, wherein a content of the (meth)acrylate compound in the coating solution is 10 to 95% by weight, a content of the reactive silica comprising a (meth)acryloyl group in the coating solution is 1 to 60% by weight, and a content of the isocyanate-based compound is 1 to 60% by weight, all based on a total amount of whole non-volatile components in the coating solution.

3. The coated film according to claim 1, wherein the blocked isocyanate has an isocyanurate structure.

4. A coated film comprising:
   a polyester film, and
   a coating layer which is formed on at least one surface of the polyester film and prepared from a coating solution, wherein non volatile components of the coating solution consist solely of:
      at least one (meth)acrylate compound,
      a reactive silica comprising a (meth)acryloyl group,
      at least one blocked isocyanate in which the blocking agent is an active methylene-based compound, and
      at least one acrylic resin.

5. The coated film according to claim 4, wherein a content of the acrylic resin in the coating solution is 0.01 to 30% by weight based on the total amount of whole non-volatile components in the coating solution.

6. A coated film comprising:
   a polyester film, and
   a coating layer which is formed on at least one surface of the polyester film and prepared from a coating solution consisting solely of:
      at least one solvent;
      at least one (meth)acrylate compound;
      at least one reactive silica comprising a (meth)acryloyl group; and
      at least one blocked isocyanate in which the blocking agent is an active methylene-based compound.

* * * * *